United States Patent
Bai et al.

(10) Patent No.: US 7,430,064 B2
(45) Date of Patent: Sep. 30, 2008

(54) ROTATION DEPENDENT HALFTONE RENDERING IN SCANNING

(75) Inventors: Yingjun Bai, Pittsford, NY (US); Xing Li, Webster, NY (US)

(73) Assignee: Xerox Corporation, Norwalk, CT (US)

(*) Notice: Subject to any disclaimer, the term of this patent is extended or adjusted under 35 U.S.C. 154(b) by 661 days.

(21) Appl. No.: 11/167,888

(22) Filed: Jun. 27, 2005

(65) Prior Publication Data
US 2006/0290990 A1   Dec. 28, 2006

(51) Int. Cl.
*H04N 1/405* (2006.01)
(52) U.S. Cl. .................. 358/3.06; 358/1.9; 358/3.2; 382/245; 382/252
(58) Field of Classification Search ............ 358/3.06
See application file for complete search history.

(56) References Cited

U.S. PATENT DOCUMENTS 4,965,677 A * 10/1990 Pennebaker et al. .... 358/426.16

* cited by examiner

*Primary Examiner*—Mark A. Robinson
*Assistant Examiner*—David S Cammack
(74) *Attorney, Agent, or Firm*—Fay Sharpe LLP

(57) ABSTRACT

A method and system for rotation-dependent halftone rendering. An image input is received from a scanning system or other source, the received image being either a contone image or an error-diffused mage. If a following right-angle image rotation is to be performed, the image is clustered by a clustering method which yields reduced file sizes with respect to the rotated orientation of the image. If no following right-angle image rotation will be performed, the binary image is clustered by an alternate clustering method which yields reduced file sizes with respect to the non-rotated image. The selective clustering includes dividing the image into a tessellation of cells and then concatenating like bits in each cell in a preferred direction for the rotated or non-rotated image. The clustered image is then rotated if necessary, and compressed.

14 Claims, 5 Drawing Sheets

FIG. 1
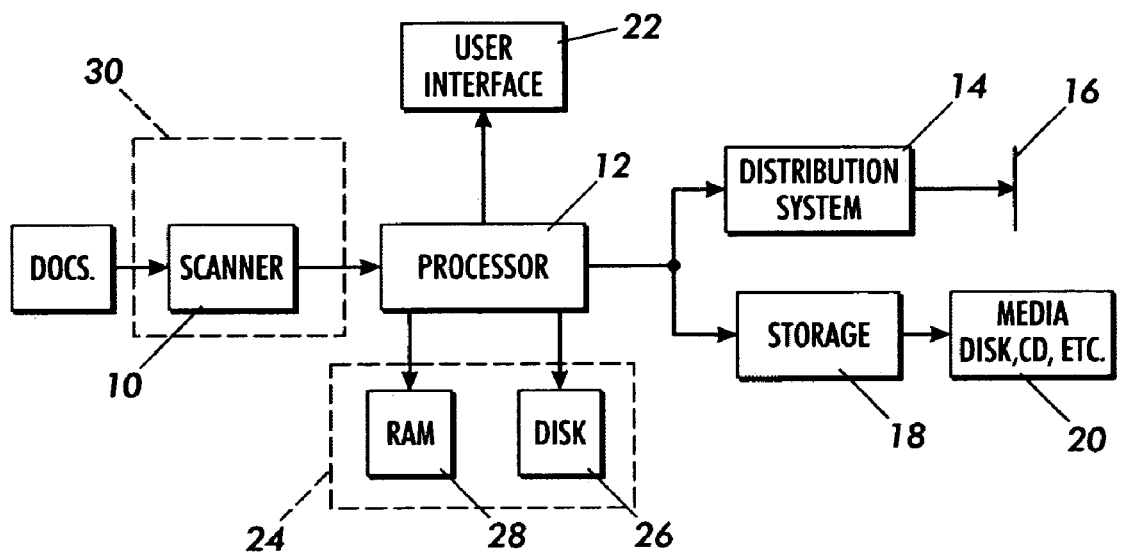
(A)
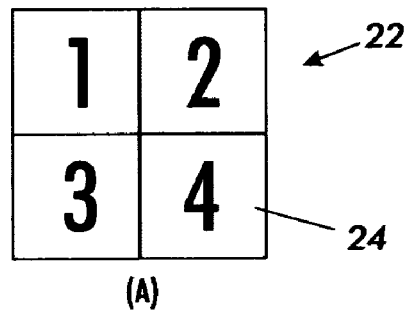
FIG. 2
(B)
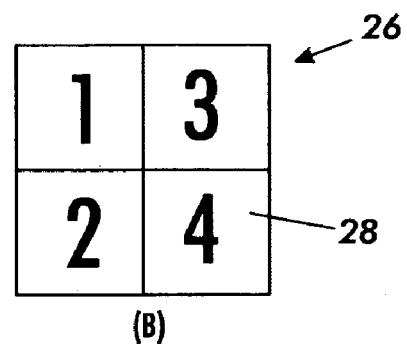
FIG. 3

FIG.4

| 1 2<br>3 4 | 1 2<br>3 4 | ... |
|---|---|---|
| 1 2<br>3 4 | 1 2<br>3 4 | |
| ⋮ | | ⋰ |

| 1 3<br>2 4 | 1 3<br>2 4 | ... |
|---|---|---|
| 1 3<br>2 4 | 1 3<br>2 4 | |
| ⋮ | | ⋰ |

| 1 2<br>3 4 | 2 1<br>4 3 | ... |
|---|---|---|
| 2 1<br>3 4 | 1 2<br>3 4 | |
| ⋮ | | ⋰ |

| 1 3<br>2 4 | 2 4<br>1 3 | ... |
|---|---|---|
| 2 4<br>1 3 | 1 3<br>2 4 | |
| ⋮ | | ⋰ |

26, 32

ROTATION DEPENDENT HALFTONE RENDERING IN SCANNING

BACKGROUND

As scanning devices and scanning services grow in popularity, the file size of the scanned images becomes more of a concern as the files impose a burden on network and storage systems. For example, many companies and organizations archive both incoming and outgoing email which places an ever-growing burden on the storage systems. The relatively large file sizes of scanned images also imposes a bandwidth burden on the networks over which the scanned images may travel.

Generally, three types of halftone choices are used for rendering binary image scans for export or storage, namely: error diffusion, hybrid, and cluster dot. For systems having a post processing capability, error diffused images may also be post processed by cluster dot halftoning. Additionally, many scanning systems, based on the orientation of the input documents being scanned, automatically rotate the scanned image to place the scanned image in a preferred reading orientation for the benefit of those viewing the images. It would be beneficial therefore to have a system and method which automatically produces halftone images which yield a reduced file size when compressed by various commonly used compression techniques, regardless of whether an image rotation occurs before performing the image compression.

BRIEF DESCRIPTION

According to aspects illustrated herein, there is provided a rotation-dependent method for halftone rendering. The method includes receiving an image input and determining if a follow-up image rotation is to be performed. The image is selectively halftoned based on determining if the follow-up rotation will be performed. The halftoning process results in more concatenating of like bits in each halftone cell in one direction if a following image rotation is to be performed, and more concatenating of like bits in each halftone cell in another direction if the following image rotation is not to be performed.

According to the aspects illustrated herein, there is also provided a method for halftone rendering which includes receiving a contone image input which is then converted to a binary error-diffused image. It is then determined if a following right-angle image rotation will be performed and the binary image is then clustered by one of two methods based on whether or not the right-angle image rotation will be performed. The selective clustering includes dividing the binary image into a tessellation of cells and then concatenating like bits in each cell in a fast-scan direction if the following right-angle image rotation will not be performed, or concatenating like bits in each cell in a direction perpendicular to the fast-scan direction if the following right-angle image rotation will be performed. The clustered image is then rotated if necessary, and compressed.

According still further aspects illustrated herein, there is also provided a scanning system including an input section, including a scanning system, for scanning images to be processed by the scanning system. A user interface, a main memory, and a processor are also provided. The processor includes program logic configured to receive an image input from the input section, determine if a following image rotation is to be performed, and selectively halftone the received image based on whether or not the rotation is to be performed. The halftoning includes halftoning the received image by concatenating like bits in each halftone cell in one direction if a following image rotation is to be performed, or concatenating like bits in each halftone cell in another direction if the following image rotation is not to be performed.

BRIEF DESCRIPTION OF THE DRAWINGS

FIG. 1 is a schematic representation of scanning system suitable for practicing concepts of the present application;

FIG. 2 is a halftone cell showing a first growth order suitable for one embodiment of the present application;

FIG. 3 is a halftone cell showing a second growth order suitable for one embodiment of the present application;

FIG. 4 is a tessellation utilizing the halftone cell of FIG. 2;

FIG. 5 is a tessellation utilizing the halftone cell of FIG. 3;

FIG. 6 is an alternate tessellation utilizing a variant of the halftone cell of FIG. 2;

FIG. 7 is an alternate tessellation utilizing a variant of the halftone cell of FIG. 3;

DETAILED DESCRIPTION

Figure 8:
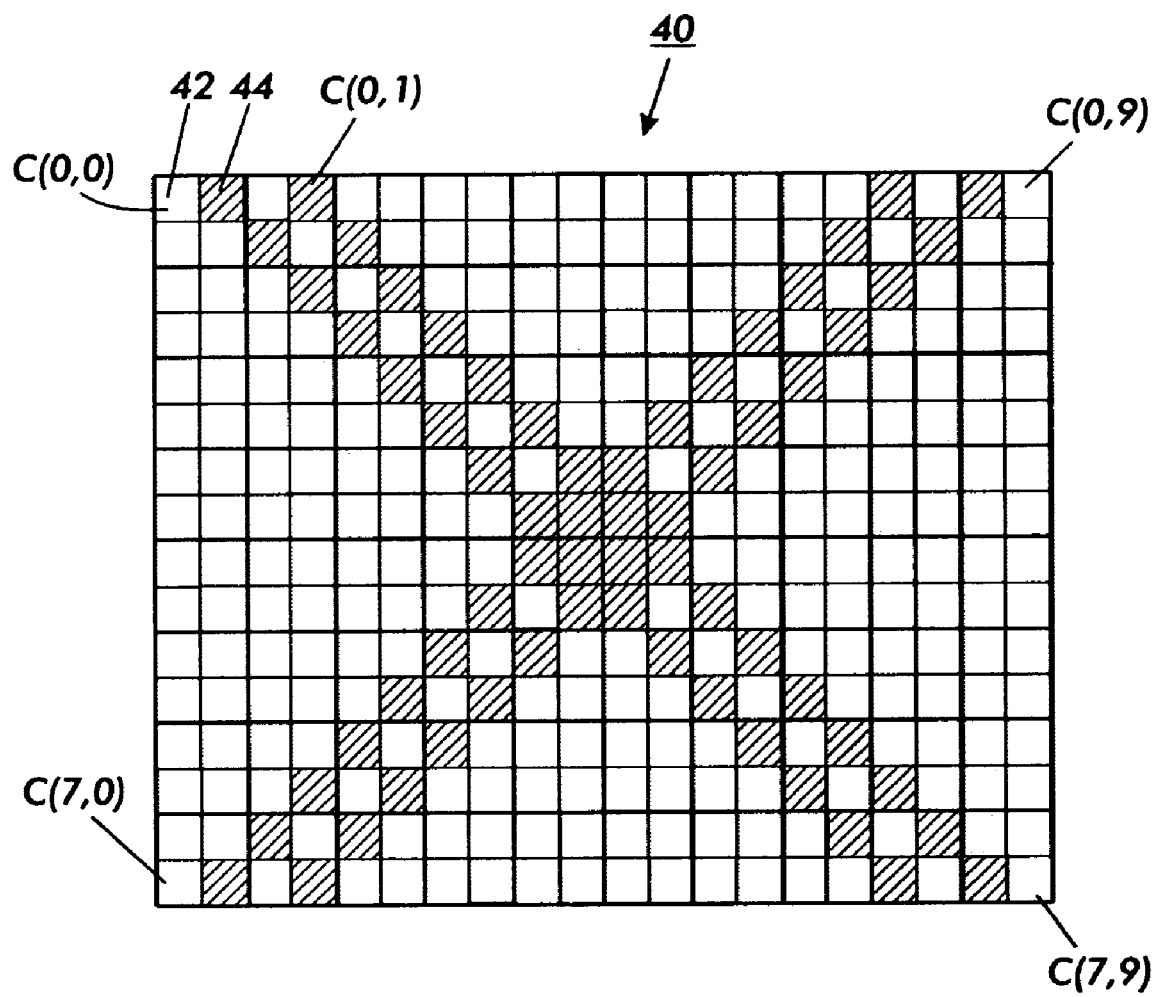
FIG. 8 is a sample error diffused image.

For a general understanding of the present application, reference is made to the drawings. While the present application is described herein with reference to grayscale continuous tone (contone) image data, and with reference to binary monochrome image data, it should be understand that concepts described herein may be applied to the processing of color images, wherein each color image separation is treated as a grayscale or monochrome image. Accordingly, references made herein to the processing of grayscale images or monochrome images are intended to include the processing of color image separations as well.

In image processing, each location and image is commonly referred to as a pixel. The term pixel may refer to a signal, e.g., electrical or optical, which represents physical optical properties at a physically definable area on an image. In a binary form of an image each pixel value is a bit. In a grayscale form of an image each pixel value is a grayscale value. In a color image, each pixel may include a set of color space coordinates. The binary form, grayscale form, and color coordinate form of an image each form a two dimensional array defining the image.

The term data is used herein refers to physical signals that include information regarding the representation of an image. The term image refers to a pattern of physical light which may include characters, words, text, and other features such as graphics in photographic representations. The image itself may be divided into regions or segments each of which itself may be considered an image. The region or segment of the image may be of any size up to and including the whole image. As used herein, an operation or process performs image processing when it operates on an item of data relating to an image or a part of an image.

With reference to FIG. 1, a scanning system is shown which may be used for scanning documents to be archived on file storage devices or which may be used for scanning documents to be distributed over a network such as by an email system. The scanning system includes a scanner 10 which may be any of a variety of scanners known in the art such as, e.g., a flatbed scanner. A scanner 10 outputs contone images which are communicated to a processor 12 for producing a halftone image or a compressed halftone image to be distributed by means of a distribution system 14 over a network 16. The network may be any type of network such as a local area network, an intranet, or a wide area network such as the internet. The processor 12 may also output the halftone images to a storage system 18 for storage on media such as, for example, magnetic disks, CDs, CDR media, CDRW media, and/or magnetic tape. The scanning system includes a user interface 22 for interacting with a user of the system, i.e., receiving commands from the user, and displaying job status and system status information to the user. Also included in the scanning system is a main storage system 24 including, e.g., one or more disk storage units 26 and random access memory (RAM) 28. The scanner 10 may be part of a larger input system 30 for receiving images from other sources such as, e.g., from the network 16. The present application describes in more detail below a system and method which compresses the processed halftone images in an efficient and effective manner without noticeably affecting the quality of the halftone images in order to maximize use of the distribution system 14 or the storage system 18.

In examining the detail of a halftoned, binary image it has been found that a more efficient compression is achieved by creating long runs of binary 1's and 0's along the fast-scan direction. That is to say, long runs of either black pixels or white pixels in the fast-scan direction provide a more compact compression. Most scanning systems have a fast-scan direction as a document is being scanned. For example, a flatbed scanner may have a full width array of detectors for scanning horizontal lines across a document in rapid fashion. This full width array is then driven by a motor in stepwise increments along the remaining document axis for scanning in the slow scan direction. A compression algorithm operating on the scanned image will normally process the image data first in the fast-scan direction and then in the slow scan direction in order to compress the full two dimensional image. Of course, long runs of 1's and 0's generated in the slow scan direction work with equal efficacy with regard to compression if the compression algorithm operates first in the slow scan direction and then on the fast-scan direction. The present application is not limited in this respect.

With reference now to FIG. 2, and for the purpose of more easily explaining concepts of the present application, embodiments of the present application will be described with reference to a small exemplary halftone cell 22 having a 2×2 arrangement of pixels having a growth order as shown, wherein the cell grows row by row in a horizontal direction and then lastly in the vertical direction. Alternately, with reference to FIG. 3, another exemplary halftone cell 26 comprising a 2×2 array of pixels 28 has a growth order as shown growing in a column-wise fashion. The halftone cell shown in FIG. 2 will hereinafter be referred to as halftone method A, and the halftone cell shown in FIG. 3 will hereinafter be referred to as halftone method B.

It is to be understood that the exemplary halftone cell 22 is normally arranged as shown in FIG. 4 to form a tessellation covering the entire image, or a selected image area. Similarly, with reference to halftone cell 26 as shown in FIG. 5, a tessellation is formed covering the selected image area. It is to be further understood, with reference to FIGS. 6 and 7, that variations of the halftone cells 22 and 26 for halftone method A and halftone method B may be used concurrently as shown.

For example, an alternate halftone cell 30 is simply a mirror image of the method A halftone cell 22 placed alternately in the tessellation as shown. Similarly, the alternate halftone cell 32 is simply a mirror image of the method B halftone cell 26.

In order to graphically illustrate concepts of the present application, with reference to FIG. 8, an error diffused image 40 including white pixels 42 and black pixels 44 arranged to form a graphical representation of the letter X is shown. In an error diffused representation of a contone image, the desired density over the image area representing image density variation is done by placing greater or lesser numbers of pixels in an on state, e.g., black pixels, in a discreet area of the image. Error diffusion attempts to maintain gray in an image by making the conversion from gray pixels to binary or other level pixels on a pixel-by-pixel basis. For example, each pixel is examined with respect to a threshold value, and the difference between the gray level pixel value and the output value is forwarded to a selected group or set of neighboring pixels in accordance with a weighting scheme. It is significant to note that, within the image 40, there are no rows containing a full run of white pixels. It is also significant to note that there are very few runs of black pixels 44 in the image, except in the central portion of the image.

Figure 9:
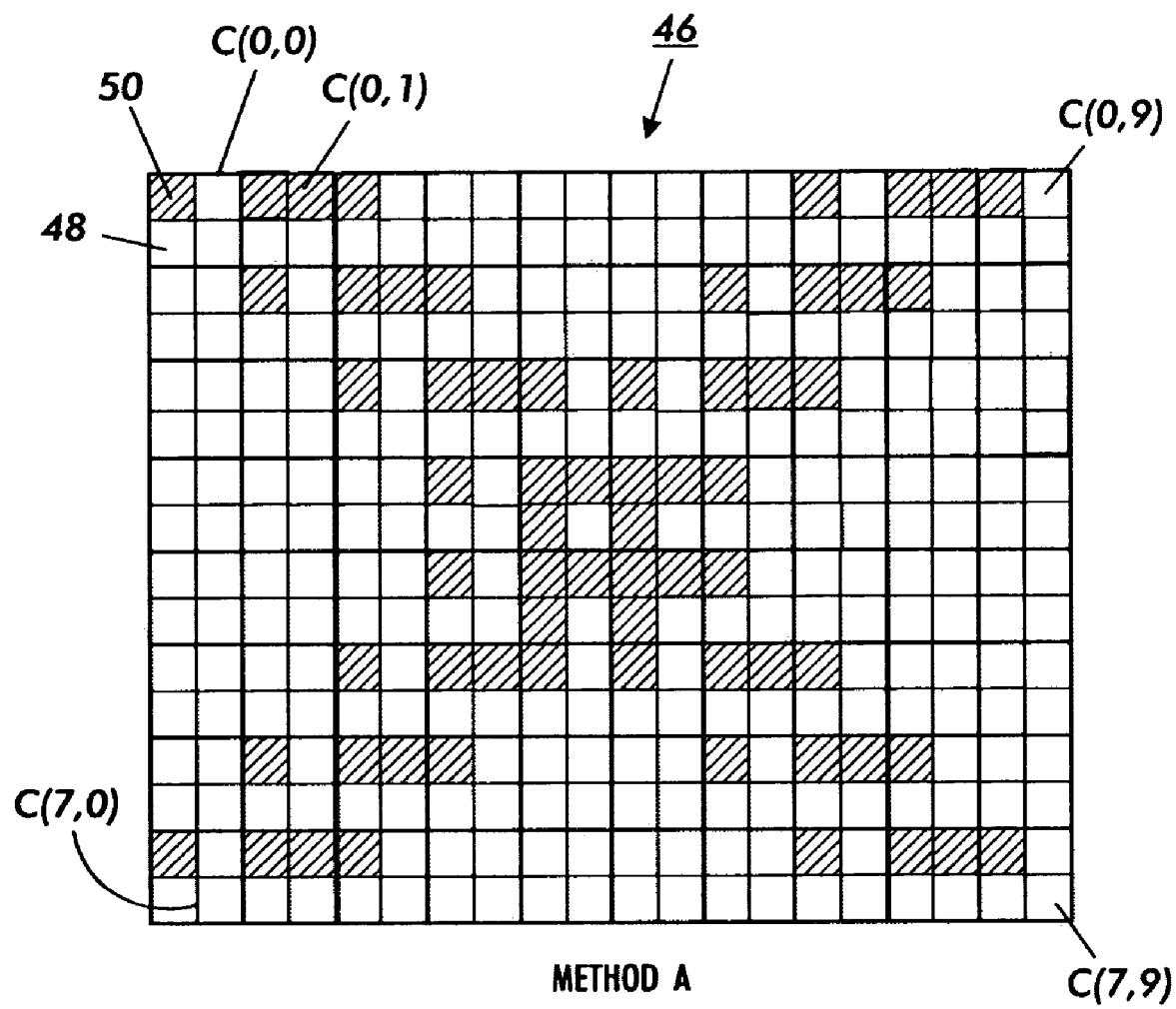
FIG. 9 is the image of FIG. 8 after a clustering operation according to concepts of the present application.

With reference now to FIG. 9, a halftone image 46 representation of the image 40 shown in FIG. 8 is provided. With continued reference to FIG. 2 and FIG. 8, the error diffused image 40 is halftoned by the halftone method A (FIG. 2) into the halftone image 46 as shown. Because embodiments of the present application preferably produce long runs of 1's and 0's in the direction along which compression is performed, i.e., concatenates the 1's and 0's respectively, and because for the present example it is assumed that the compression direction is in the horizontal fast-scan direction, halftone method A has been chosen for this example. Accordingly, the image 46 includes a plurality of halftone cells 48, each halftone cell including a 2×2 array of pixels 50. Individual halftone cells in the image 46 are referenced in a row-wise, column-wise fashion. For example, the left uppermost halftone cell is labeled C(0,0), while the right bottom most cell is labeled C(7,9), the enclosed numerals indicating the respective row and column of the halftone cell.

An examination of halftone method A makes it readily apparent that the growth order shown in the exemplary halftone cell is designed to reorder the pixels in the error diffused image 40 according to the number of pixels that are in an on state in the respective halftone cell positions in the error diffused image. For example, with reference to the error diffused image 40, the pixel positions corresponding to the pixel positions of halftone cell C(0,0) include only one pixel in the on state. Therefore, according to the growth order of halftone method A only the top left-most pixel of halftone cell C(0,0) is in an on state. In similar fashion, with reference to halftone cell C(0,1), because the corresponding pixels of the error diffused image 40 have 2 pixels in the on state, according to the growth order of halftone method A, only the upper-most two pixels of the halftone cell C(0,1) are placed in an on state. It may be readily observed that it is not necessary to map specific pixels from error diffused image 40 into halftone image 46 but, rather, it is only necessary to count the number of cells in an on state in positions of the error diffused image 40 corresponding to a halftone cell location in the halftone image 46. The halftone cell in the halftone image may then be populated according to the number of on-state pixels and the selected growth order.

It is illustrative to compare the number of runs occurring in the error diffused image 40 versus the number of runs occurring in halftone image 46 for purposes of demonstrating advantages of the present application. For example, in examining the error diffused image 40 in a pixel-wise fashion from left to right and then top to bottom it may observed that there is a total of 113 runs in the image. The counting methodology is as follows. The top left most pixel of the image is a pixel in the off state and the adjacent pixel in the same row is a pixel in the on state. Therefore, the first pixel counts as one run. The pixel adjacent and to the right of the second pixel is in the off state so the second pixel counts as one run. The group of pixels in the center of the first row of the image is made up of pixels which are all in an off state and, therefore, only count as one run. In counting pixels at the end of a row, pixels at the beginning of the following row are counted as part of the same run if they are in the same state as the ending pixel in the previous row.

With reference to FIG. 9, counting runs in the same fashion for the halftone image 46 versus the error diffused image 40. It is determined that there is a total of only 64 runs in the image which, according to many compression techniques, will result in a significant reduction in file size. Most binary image compression techniques take advantage of the fact that a number of identical pixels in a long run may be efficiently compressed. For example, the long run may be encoded simply by specifying the number of pixels in the run with the corresponding pixel value, thereby eliminating or reducing the storage requirements for the large number of pixels in the run. One suitable compression algorithm is the JBIG2 arithmetic compression developed by the joint bi-level experts group for the efficient lossless and lossy compression of bi-level black and white images.

Figure 10:
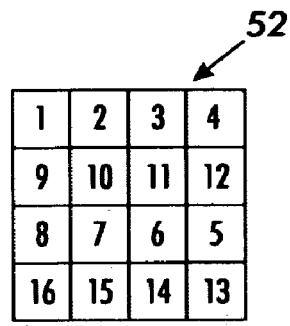
FIG. 10 is an alternate halftone cell.

It is to be understood that the halftone method A shown in FIG. 2 is an exemplary halftone method only. Typically, halftone cells larger than a 2×2 matrix are used, and the halftone cells are not necessarily rectangular in format. Any shape of halftone cells, or a plurality of shapes, that can form a tessellation over the image area may be utilized in order to practice concepts of the present application. Nor is the present application limited to the exemplary growth order illustrated in the figure. For example, with reference to FIG. 10, a growth order 52 of a 4×4 halftone cell fills in alternating rows of the halftone cell. The illustrated growth order also suffices to provide longer runs of 1's and 0's in the halftone image. The present application is limited in growth order only in the respect that the growth order produces sufficiently long runs of 1's and 0's in the halftone image to provide a beneficial compression improvement to the image when used in a compression algorithm. Nor is the present application limited by the particular compression algorithm used to compress the halftone image after the halftoning process.

Figure 11:
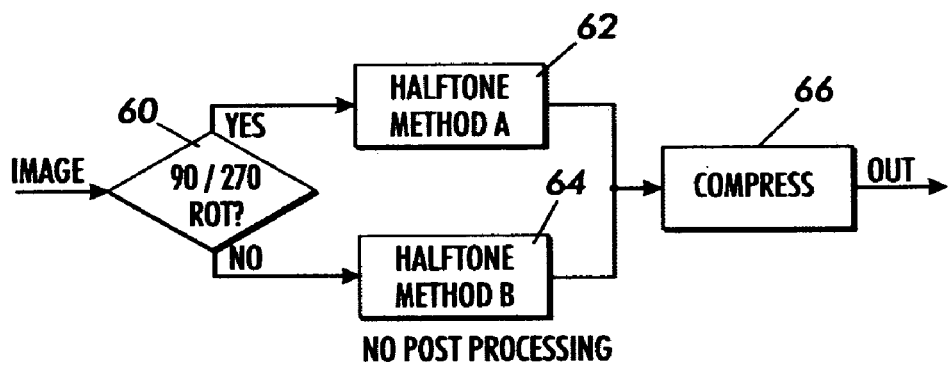
FIG. 11 is a flowchart of a method of the present application.

With reference now to FIG. 11, a flowchart describing rotation-dependent halftone rendering and compression according to concepts of the present application is provided. The logic of the flowchart is incorporated into processor 12 as shown in FIG. 1, and it is assumed that a contone image has been received from the scanner 10 by the processor 12 prior to a first step of the flowchart. At a first rotation-determination step 60, it is first determined whether the resultant halftone image is to be rotated before a compression step by either of 90° or 270° rotation. As previously described, it is desirable to create long runs of 1's and 0's in the direction along which compression is taking place, i.e., the effectiveness of the compression is rotation dependent. Therefore, if it is determined at step 60 that a 90° or 270° rotation is taking place, processing continues at step 62 where halftone method A is used to halftone the received contone image. Otherwise, processing continues at step 64 where halftone method B is used to halftone the received image. Following the halftoning at either of step 62 or step 64, compression takes place at step 66 using any of a number of readily available compression techniques such as the previously mentioned JBIG2 compression algorithm.

Figure 12:
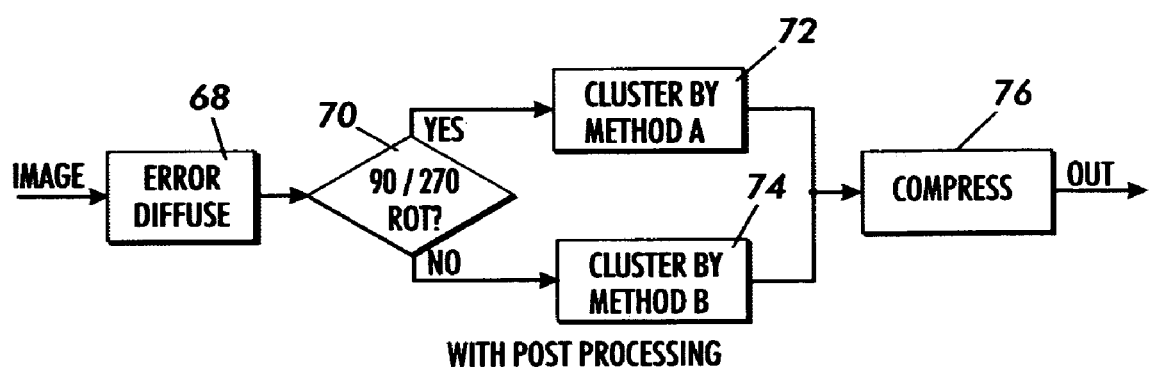
FIG. 12 is a flowchart of an alternate method of the present application utilizing post processing.

With reference now to FIG. 12, a second procedure involving a post-processing step 68 is described. In this procedure, the received contone image is converted to an error diffused image at step 68 before a determination is made at step 70 as to whether the image is to be rotated by 90° or 270°. Similar to the previously described procedure, if a rotation is to take place, a clustering step using the halftone clustering according to halftone method A is performed at step 72. Otherwise, clustering according to halftone method B is performed at step 74. In each case, however, processing continues with compression at step 76.

To demonstrate the effectiveness of the above-described rotation-dependent halftone rendering and compression methods, two images were scanned at four different resolutions for each image, namely 200 dpi, 300 dpi, 400 dpi, and 600 dpi. Each scan produced an error-diffused output. Each of the scanned images was clustered, without rotation, using each of the halftone methods A and B described previously with reference to FIGS. 2 and 3. Each of the 16 clustered images was compressed using JBIG2 arithmetic compression, and the results tabulated in Table 1 below.

TABLE 1

|  | Method A size in kB (Fast-scan direction) | Method B size in kB (Remaining direction) |
|---|---|---|
| Image 1 | 88 | 123 |
| Image 1 | 224 | 279 |
| Image 1 | 369 | 494 |
| Image 1 | 956 | 1235 |
| Image 2 | 60 | 81 |
| Image 2 | 123 | 161 |
| Image 2 | 195 | 266 |
| Image 2 | 419 | 587 |

It is readily apparent that a more efficient compression is achieved by creating long runs of binary 1's and 0's, as demonstrated in this particular test case by method A which produced the long runs in the fast-scan direction. If, however, a 90° or 270° rotation had been applied to the clustered image, a similar advantage would have been shown for method B in comparison to method A. This test demonstrates that by deploying a different halftone method based on a following rotation of the scan output that an improved compression can be achieved without sacrificing image quality by a noticeable degree.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for halftone rendering, the method comprising:

receiving an image;

determining if a following image rotation is to be performed; and selectively halftoning the image based on the determining, the selective halftoning including:

concatenating like bits in each halftone cell in a first direction if a following image rotation is to be performed; and concatenating like bits in each halftone cell in a second direction if the following image rotation is not to be performed.

2. The method of claim 1, wherein:

the concatenating like bits in each halftone cell in the first direction comprises concatenating like bits in each halftone cell in a fast-scan direction; and the concatenating like bits in each halftone cell in the second direction comprises concatenating like bits in each halftone cell in a direction perpendicular to the fast-scan direction.

3. The method of claim 1, wherein:

the concatenating like bits in each halftone cell in the first direction comprises concatenating like bits in each halftone cell in a direction perpendicular to a fast-scan direction; and the concatenating like bits in each halftone cell in the second direction comprises concatenating like bits in each halftone cell in the fast-scan direction.

4. The method of claim 1, wherein:

the concatenating like bits in each halftone cell in the first direction comprises utilizing a two-dimensional halftone cell having a growth order configured to turn on pixels in an order parallel to the first direction; and the concatenating like bits in each halftone cell in the second direction comprises utilizing a two-dimensional halftone cell having a growth order configured to turn on pixels in an order parallel to the second direction.

5. The method of claim 1, wherein:

the determining if a following image rotation is to be performed includes determining if a following image rotation of at least one of 90 degrees and 270 degrees is to be performed.

6. The method of claim 1, wherein:

the receiving an image includes receiving a contone image.

7. The method of claim 6, further including:

converting the contone image to an error diffused image.

8. The method of claim 1, further including:

selectively rotating the halftoned image based on the determining; and compressing the halftoned image using a binary image compression algorithm.

9. The method of claim 8, further including:

outputting the compressed image to at least one of an image storage system and a distribution system.

10. A scanning system, the scanning system comprising:

an input section including a scanning system for scanning images to be processed by the scanning system;

a user interface;

a main memory; and a processor, the processor including program logic configured to:

process image data for an image received by the input section;

determine if a following image rotation is to be performed; and selectively halftone the received image based on the determining, the selective halftoning including:

halftoning the received image by concatenating like bits in each of a plurality of halftone cells in a first direction if a following image rotation is to be performed; and halftoning the received image by concatenating like bits in each of the plurality of halftone cells in a second direction if the following image rotation is not to be performed.

11. The scanning system of claim 10, wherein:

the concatenating like bits in each halftone cell in the first direction includes utilizing a two-dimensional halftone cell having a growth order configured to turn on pixels in an order parallel to at least one of a fast-scan direction and a direction perpendicular to the fast-scan direction; and the concatenating like bits in each halftone cell in the second direction includes utilizing a two-dimensional halftone cell having a growth order configured to turn on pixels in an order perpendicular to the first direction.

12. The scanning system of claim 10 wherein the processor program logic is further configured to:

convert the received image from a contone image to a binary error-diffused image.

13. The scanning system of claim 10 wherein the processor program logic is further configured to:

selectively rotate the halftoned image by at least one of 90 degrees and 270 degrees; and compress the halftoned image.

14. The scanning system of claim 13 wherein the processor program logic is further configured to:

output the compressed halftoned image to at least one of a distribution system and a storage system.

* * * * *